Aug. 20, 1935.   G. D. SUNDSTRAND   2,011,836
MACHINE TOOL
Filed March 22, 1930   5 Sheets-Sheet 3

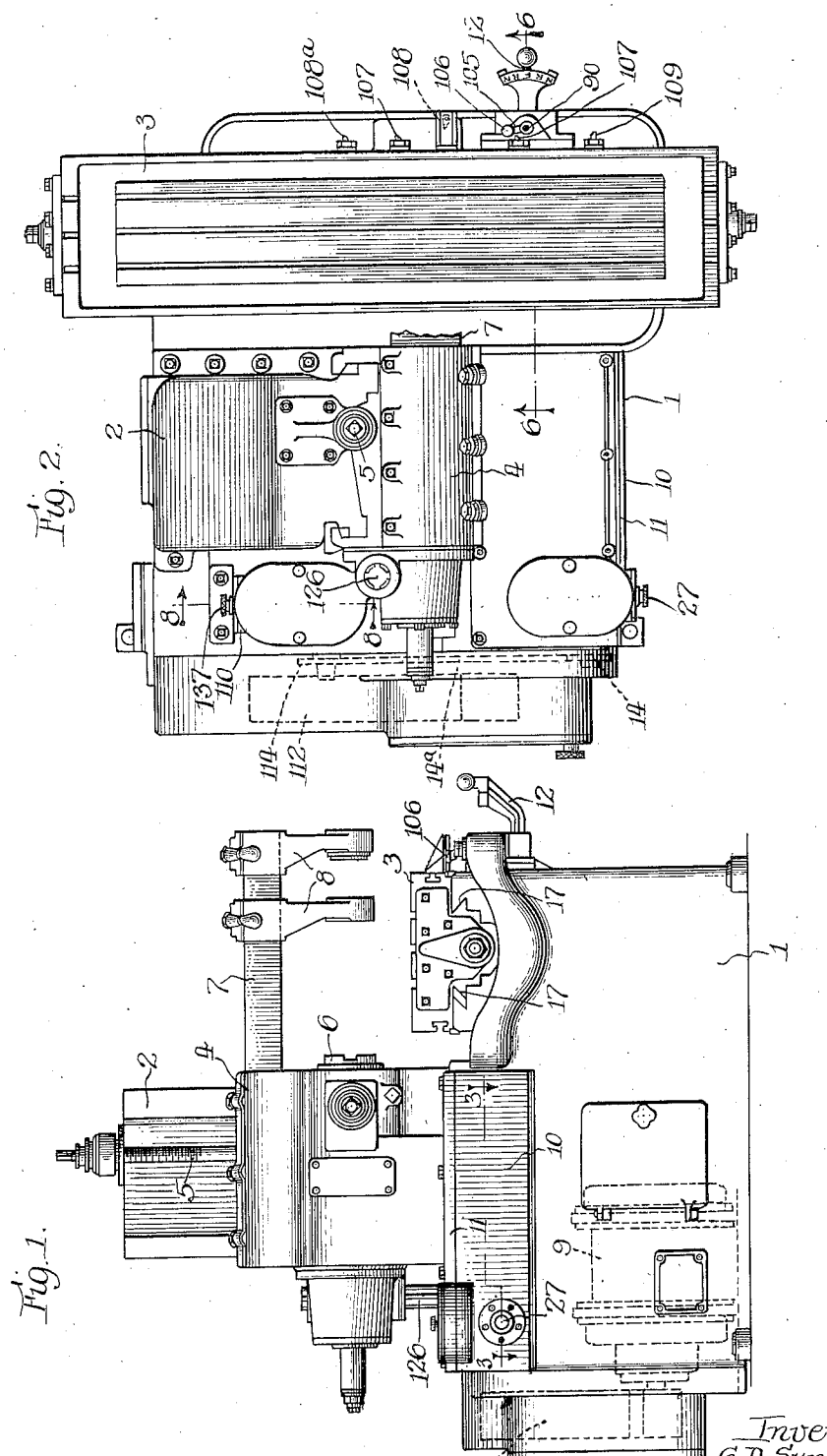

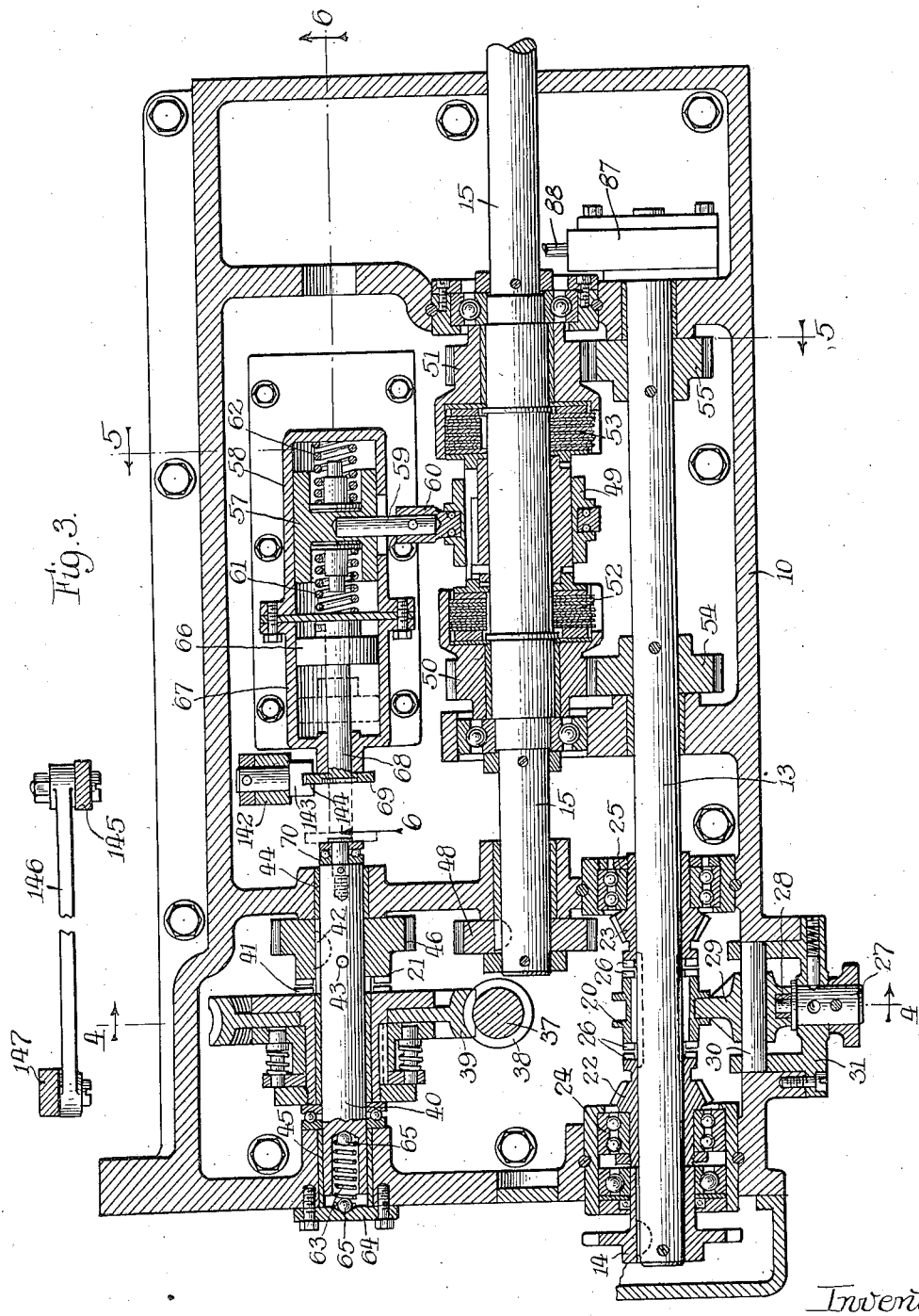

Inventor:
G. D. Sundstrand,
By Chindahl Parker Carlson
Attys.

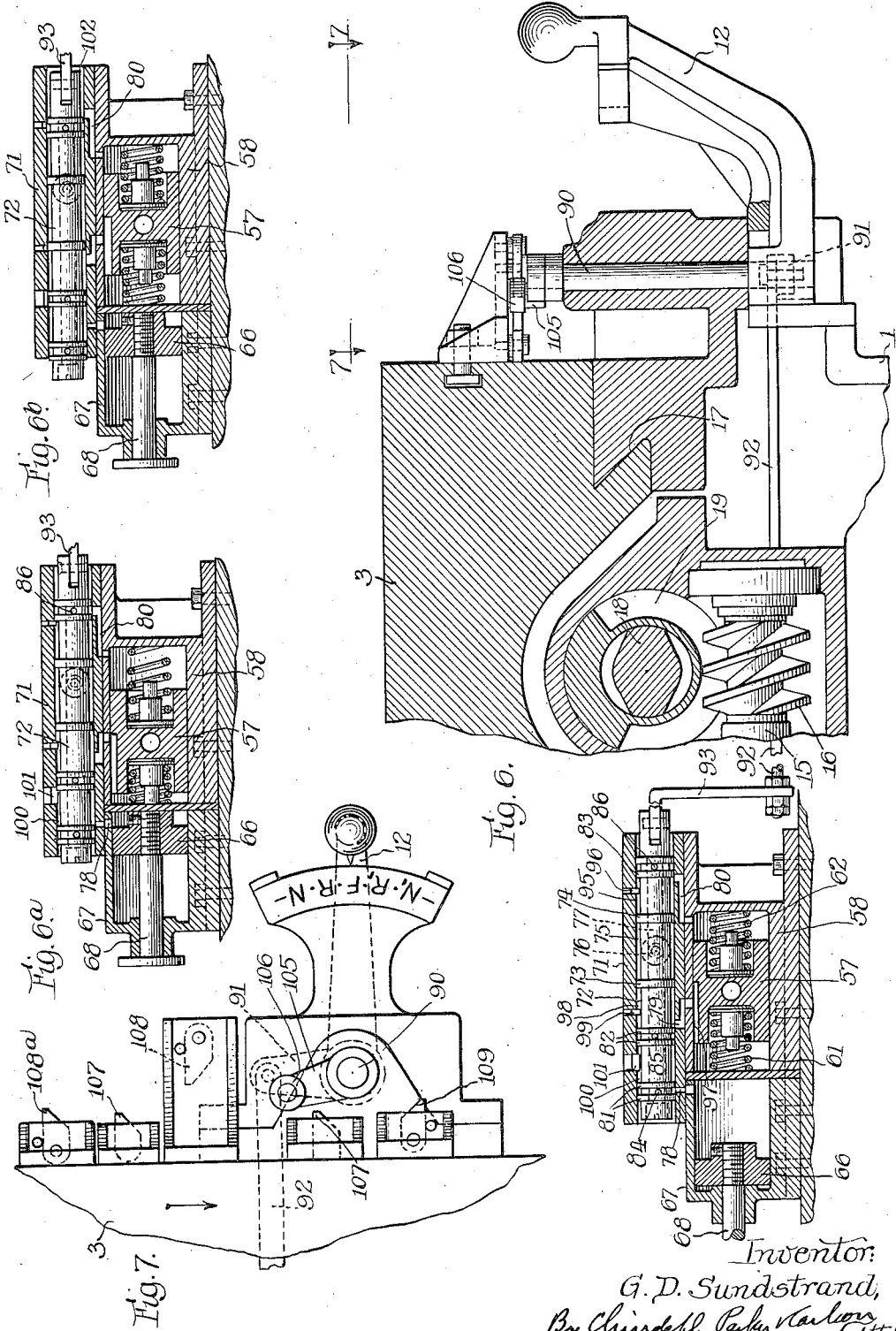

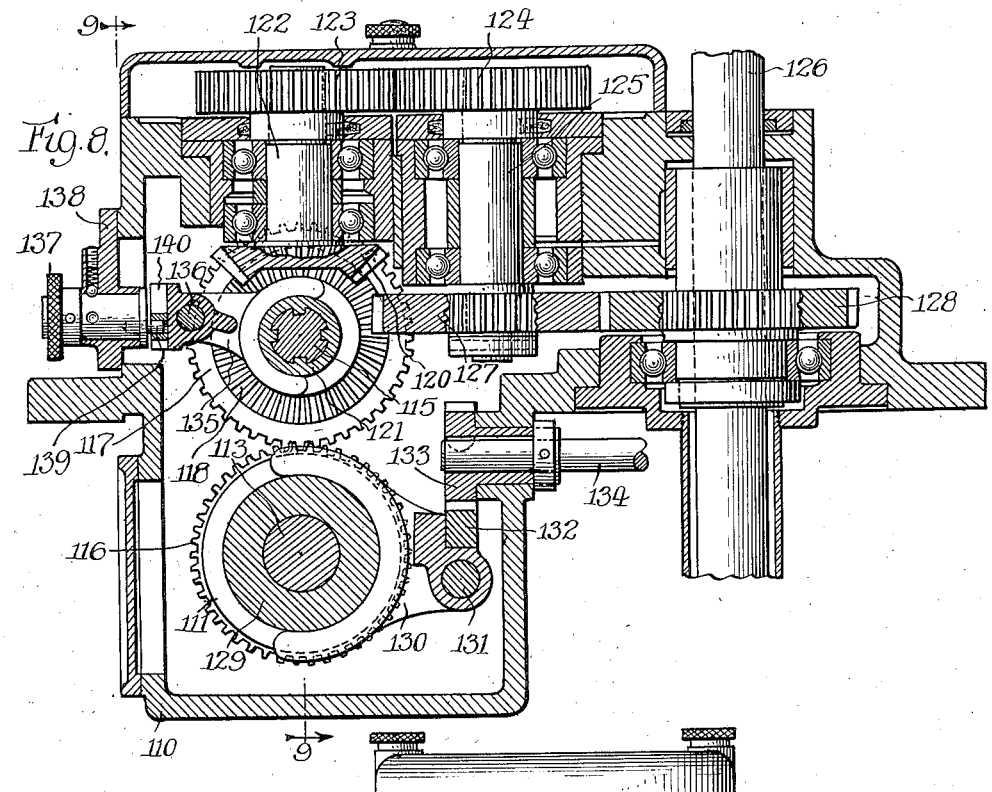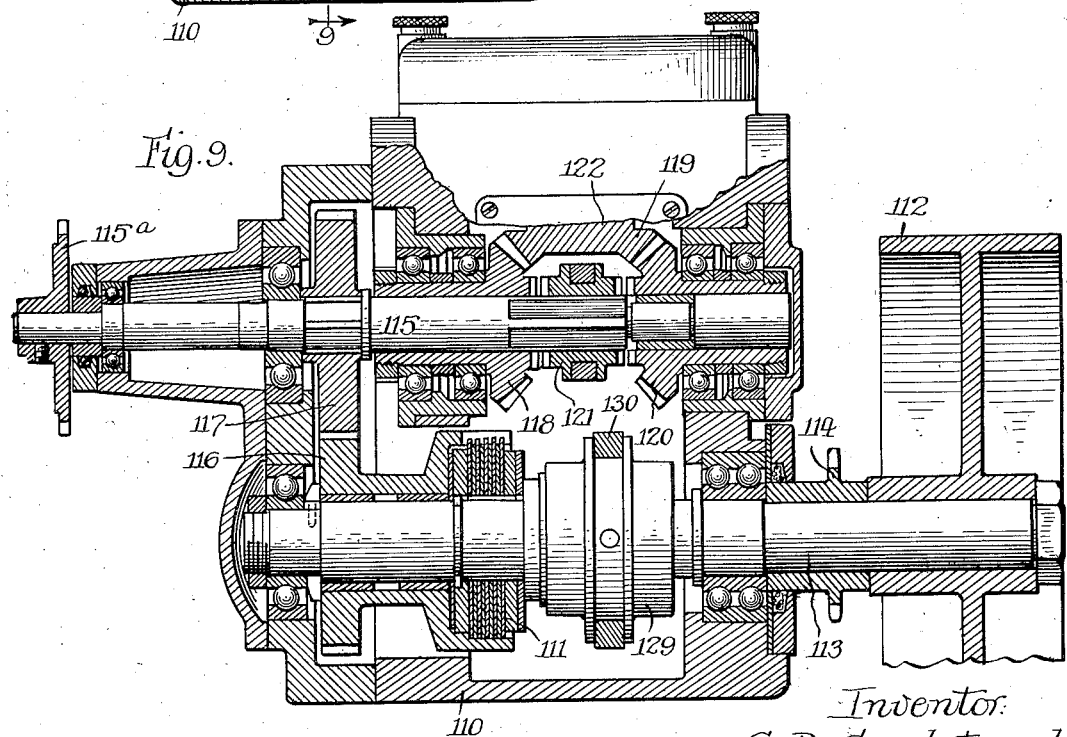

Patented Aug. 20, 1935

2,011,836

UNITED STATES PATENT OFFICE 2,011,836

MACHINE TOOL

Gustaf David Sundstrand, Rockford, Ill., assignor to Sundstrand Machine Tool Co., Rockford, Ill., a corporation of Illinois Application March 22, 1930, Serial No. 438,008

17 Claims. (Cl. 90—21)

More particularly the invention relates to a new and improved mechanism for actuating tool and work supports of machine tools and for controlling the movements thereof. For purposes of illustration the invention will be described as embodied in a milling machine but it is to be understood that it might equally well be embodied as a whole or in part in other types of machine tools for actuating and for controlling the movements of work and tool supports.

The general object of the invention is to provide an improved machine embodying a novel mechanism for actuating movable work and tool supports together with control means for the mechanism arranged to permit the machine to be operated at maximum efficiency and at high speeds with a minimum of wear and tear.

Another object is to provide a milling machine having a novel feeding mechanism for the work table which is conveniently mounted for purposes of assembly, inspection and repair.

Another object is to provide a novel control means for a mechanical feed box embodying a plurality of clutches whereby the clutches may be shifted manually or automatically during the operation of the machine.

Another object is to provide hydraulically operated means for shifting the control members of the feed mechanism.

A further object is to provide a new and improved automatic means for controlling the starting and stopping of the tool supporting member of the machine.

Further objects and advantages will become apparent from the following detailed description taken in connection with the accompanying drawings, in which:

Figure 1 is a side elevation of a milling machine embodying the preferred form of the invention.

Fig. 2 is a plan view thereof.

Fig. 3 is a horizontal section through the feed box, being approximately along the line 3—3 of Figs. 1 and 5.

Fig. 6 is a fragmental vertical section approximately along the line 6—6 of Figs. 2 and 3, the control valve and piston and cylinders being shown in their feed position.

Figure 4:
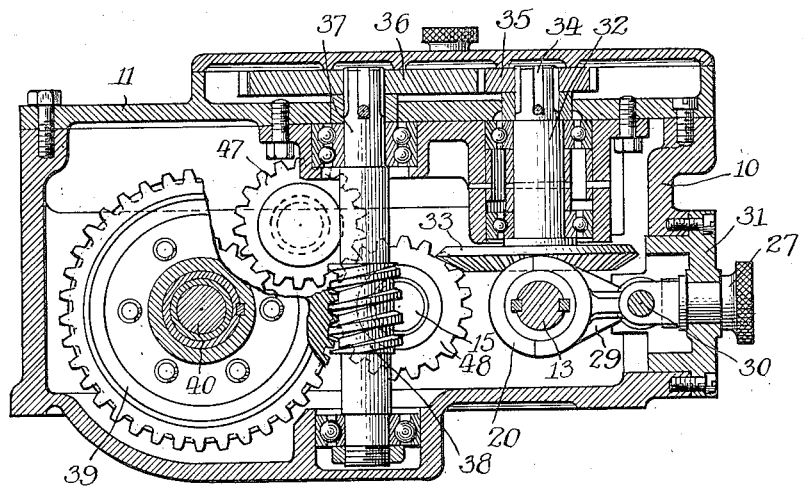
Fig. 4 is a vertical section along the line 4—4 of Fig. 3.

Figs. 6ª and 6ᵇ are vertical sections through the control valve and piston and cylinder devices showing the valve and pistons in rapid traverse and neutral positions respectively.

Fig. 7 is a fragmentary plan view along the line 7—7 of Fig. 6.

Fig. 8 is a vertical section along the line 8—8 of Fig. 2.

Fig. 9 is a vertical view partly in section, along the line 9—9 of Fig. 8.

While the invention is susceptible of embodiment in many different forms, there is shown in the drawings and will herein be described in detail one such embodiment with the understanding that the present disclosure is to be considered as an exemplification of the principles of the invention and is not intended to limit the invention to the embodiment illustrated. The scope of the invention will be pointed out in the appended claims.

As disclosed herein the preferred form of the invention is embodied in a milling machine which, as illustrated in Figs. 1 and 2 comprises generally a bed or base 1 having a column 2 rising from one rear corner thereof and a horizontal work support or table 3 slidably mounted for movement transversely in front of said column. A saddle or head 4 is slidably mounted on the column 2 and is adapted to be adjusted vertically by means including a manually operable feed screw 5. This head has a tool or cutter spindle 6 rotatably mounted thereon and supports an overarm 7 which at its outer end may be provided with one or more outboard bearing supports 8 for the outer end of the cutter arbor (not shown). The tool spindle 6 is arranged to be driven from a motor 9 by means of suitable gearing (Figs. 8 and 9) which embodies a disconnecting or spindle clutch 111 and is hereinafter more fully described. The table is actuated by power derived from the motor 9 through intermediate gearing which includes speed and direction changing gearing contained in a feed box 10 positioned on the rear of the bed 1 to one side of the column 2. It is to the driving mechanism for the work and tool supports and the means for controlling this mechanism that the present invention is more particularly directed.

It will be readily apparent that with the feed box 10 positioned as illustrated in Figs. 1 and 2, it is readily accessible not only for purposes of assembly but also for inspection and repair. Preferably it is provided with a detachable cover 11 which closes the entire upper end of the box so that when the cover is removed, the mechanism within the box is fully exposed, much in the manner illustrated in Fig. 3. This position of the feed box also permits of a simplified driving connection to the table, as hereinafter more fully described.

The invention in the exemplary form, contemplates movement of table 3 by mechanical means driven from the motor 9 and the provision of a novel hydraulically operated control mechanism for the mechanical clutches, which control mechanism may be operated manually by means of a control handle 12 positioned at the front of the machine or by means of an automatic trip mechanism actuated by dogs carried on the front edge of the table. The mechanical mechanism is positioned principally within the feed box 10 and comprises generally means for feeding the table at a slow rate in opposite directions, suitable for cutting operations, or for traversing the table at a rapid rate in opposite directions, suitable for advancing and returning the table when no cutting is taking place.

This mechanism, in the form illustrated herein, includes a drive shaft 13 (Fig. 3) which is rotatably mounted within the feed box 10 and extends forwardly from the rear of the machine. The shaft is adapted to be driven positively from the motor 9 by means which is independent of the spindle clutch 111 and includes a sprocket 14 secured to the rear end of the shaft and a chain 14a (Fig. 2) connecting said sprocket with the drive sprocket 114. The power is transmitted from shaft 13 to the table by means of clutches and gearing within the feed box including a shaft 15 (Figs. 3 and 5) which extends parallel to the shaft 13 and out through the forward end wall of the feed box. At its forward end this shaft is coupled to a worm 16 (Fig. 6) which is rotatably mounted on the bed 1 beneath the table 3. The table, as mentioned hereinbefore is slidably mounted on the bed, being guided for movement thereon by means of ways 17, and carries a non-rotatable feed screw 18. The worm 16 meshes with a worm wheel 19 which is rotatably mounted on the bed 1 and is provided with an interior thread acting as a nut for the feed screw. The feed shaft 15 is arranged to be driven at slow speeds for feeding the table or at a rapid speed for traversing the table by means now to be described.

The means for driving the shaft 15 at slow rates of speed for feeding the table will first be described. As illustrated most clearly in Figs. 3 and 4, this means includes a reversing feed clutch element 20 and a disconnecting feed clutch 21. The reversing clutch comprises a pair of oppositely positioned bevel gears 22 and 23 rotatably mounted within the feed box by means of ball bearings 24 and 25 and having central bores through which the drive shaft 13 passes. These gears and the element 20 which is positioned intermediate the adjacent ends of the gears, are provided with clutch teeth 26. The clutch element is arranged to be shifted manually by means of a control device 27 mounted on the adjacent wall of the feed box, which device carries at its inner end an eccentric pin 28 arranged to actuate a clutch yoke 29 which is slidably mounted on a rod 30. As illustrated in Figs. 3 and 4, the control device 27 and yoke are mounted on a detachable plate or bushing 31.

As shown in Fig. 4, the cover 11 of the feed box supports a short vertical shaft 32 which carries a bevel gear 33 on its lower end meshing with the gears 22 and 23. Thus depending upon which way the clutch element 20 is shifted, the shaft 32 may be driven in opposite directions, through the gear 22 or the gear 23. The upper end of the shaft 32 is preferably provided with a plurality of splines 34 to drive one gear 35 of a set of pick-off gears. The other gear 36 of this set is similarly mounted on the upper end of a shaft 37 positioned adjacent and parallel to the shaft 32. The shaft 37 is provided with a worm 38 which meshes with a worm wheel 39 rotatably mounted on a horizontally extending shaft 40. The worm wheel has clutch teeth 41 (Fig. 3) on one end thereof which form one element of the feed disconnecting clutch and are arranged to be engaged by the clutch 21 mentioned hereinbefore. The clutch element 21 is preferably secured to the shaft 40 by means of a key 42 and a pin 43, the shaft being slidable longitudinally in its bearings 44 and 45 as well as being rotatably mounted therein. As shown herein the clutch element 21 has gear teeth 46 formed thereon which engage with an intermediate gear 47 (Fig. 4) which in turn drives a gear 48 (Fig. 3) on the rear end of the shaft 15. Thus with the feed reversing clutch 20 engaged with either the gear 22 or the gear 23, the table is moved in the corresponding direction whenever the feed clutch 21 is engaged.

Figure 5:
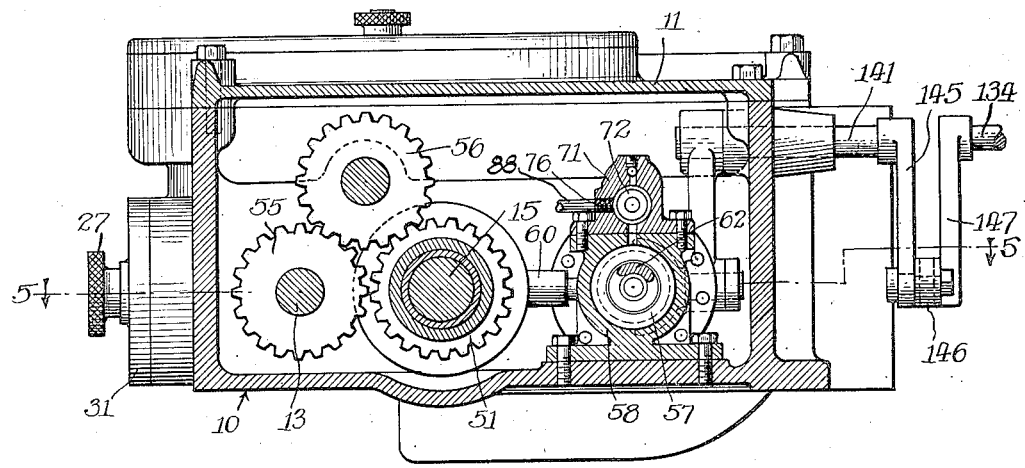
Fig. 5 is a vertical section along the line 5—5 of Fig. 3.

The means provided in the exemplary embodiment of the invention for driving the shaft 15 at a traverse speed is illustrated most clearly in Figs. 3 and 5 and comprises a reversing traverse clutch having a shiftable element 49. A pair of spur gears 50 and 51 rotatably mounted on the shaft 15 have portions carrying elements of friction type clutches 52 and 53 and are arranged to be driven in opposite directions from the drive shaft 13. As illustrated herein, the gear 50 is driven directly from the shaft 13 by means of a spur gear 54 whereas the gear 51 is driven in the opposite direction by means of a spur gear 55 on the shaft 13 and an intermediate idler gear 56 (Fig. 5). The other elements of the friction clutches 52 and 53 are carried on the shaft 15 to rotate therewith, clutch 52 being engaged when the element 49 is shifted to the left (Fig. 3) and clutch 53 being engaged when the element 49 is shifted to the right.

In its preferred form, the invention embodies hydraulically operated means for actuating the feed clutch 21 and the traverse reversing clutch 49, this means being arranged so that the traverse reversing clutch is held in neutral when the feed clutch is engaged and so that the feed clutch is disengaged when the traverse clutch is engaged. As illustrated herein, the means for actuating the traverse reversing clutch (Figs. 3 and 6) comprises a piston 57 slidably mounted in a cylinder 58. This piston caries a pin 59, the free end of which extends through a slot in the cylinder wall and is attached to a yoke 60 engaging the clutch element 49. The piston is normally held in its mid position in the cylinder to maintain the clutch 49 in neutral. This may be accomplished by means of a pair of coiled springs 61 and 62 positioned intermediate the opposite ends of the piston and the ends of the cylinder.

The feed clutch 21 is normally held in its disengaged position by means of a coil spring 63 (Fig. 3) positioned partly in a recess in the left hand end of shaft 40 with its outer end bearing against a detachable plate 64 secured to the end wall of the feed box 10. Ball bearings 65 are preferably positioned intermediate the ends of the spring and the shaft 40 and plate 64 so as to permit free rotation of the shaft. The feed clutch is arranged to be engaged by means of a piston 66 (Figs. 3 and 6) slidable in a cylinder 67 and having a piston rod 68 extending through an aperture in the left end wall of the cylinder in axial alinement with the shaft 40. As will be apparent from Fig. 3, when the piston 66 is moved to the left as shown in dotted lines, the disk 69 secured on the end of the piston rod abuts the end of shaft 40 and slides said shaft together with the clutch 21 carried thereby, toward the left. A ball thrust bearing 70 is preferably mounted on the end of the shaft 40 to permit free rotation of the shaft with respect to the disk 69.

The pistons 57 and 66 are preferably arranged to be controlled by means of a unitary valve mechanism which is operable manually by means of the handle 12 or automatically by means of a dog operated trip device. The valve mechanism as illustrated in Figs. 5, 6, 6a and 6b comprises a casing 71 having a cylindrically formed valve 72 slidable therein. This valve is provided with peripheral collars 73 and 74 which coact with the casing to define an inlet chamber 75 to which fluid under pressure may be admitted through an inlet port 76. A gear pump 87 (Fig. 3) mounted within the casing 10 is arranged to be driven by the end of the shaft 13 and has its outlet connected to the inlet port 76 by means of a conduit 88 (Figs. 3 and 5). The valve has a longitudinally extending bore 77 which receives the fluid from the inlet chamber 75 through a radial port in the valve intermediate the collars 73 and 74.

The valve casing 71 is provided with a port 78 communicating with the right hand end of the cylinder 67, a port 79 communicating with the left hand end of the cylinder 58, and a port 80 communicating with the right hand end of the cylinder 58. The valve 72 is provided with delivery ports arranged to communicate with the ports 78, 79 and 80 respectively when the valve is in different positions. These delivery ports are peripherally formed by providing the valve member with pairs of peripheral collars 81, 82 and 83 between which radial ports 84, 85 and 86 are positioned. The pairs of collars form peripheral recesses therebetween which are arranged to connect with the ports 78, 79 and 80 as hereinafter more fully described.

The manual control handle 12 is mounted on the lower end of a vertically extending shaft 90 rotatably supported in a forwardly extending portion of the bed 1 so that the upper end of the shaft 90 is positioned adjacent the front longitudinal edge of the table 3. The valve 72 is arranged to be operated by the handle 12 by means of an arm 91 (Figs. 6 and 7) secured to the lower end of the shaft 90, and a rod 92, pivotally connected at its forward end to the free end of the arm 91, and at its rear end, secured to the lower end of a bar 93, the upper end of which is attached to the valve. The control handle 12 is provided with five different positions as indicated in Fig. 7. When in its mid position as illustrated, the table 3 will be moved at a feed speed in the direction determined by the feed reversing clutch 20. On each side of the feed position of the handle are the rapid traverse positions and beyond the rapid traverse positions are two neutral positions. Thus the handle has five different positions corresponding to five different positions of the valve 72.

With the control handle 12 in its mid position as shown in Figs. 6 and 7, the valve 72 is in position to admit pressure fluid (preferably oil) to the cylinder 67 to force the piston 66 to the left and engage the feed clutch. The reversing traverse clutch is then held in its neutral position by means of the springs 61, 62, the opposite ends of the cylinder 58 being then connected to exhaust. The exhaust passage from the right hand end of the cylinder comprises the port 80, a chamber 95 surrounding the valve member intermediate the collars 74 and 83 and an exhaust port 96 in the valve casing 71. The exhaust passage from the left hand end of the cylinder 58 comprises a longitudinally extending passage 97 in the cylinder 57, the port 79, a chamber 98 formed between the collars 73 and 82 of the valve member and an exhaust port 99 in the valve casing.

Fig. 6a illustrates the positions of the valve and pistons when the control handle 12 is moved to a rapid traverse position whereas Fig. 6b illustrates the positions of the parts when the control handle 12 has been moved to a neutral position to stop the table. When the parts are, as in Fig. 6a, the right hand end of the cylinder 67 is connected to exhaust through a passage comprising the port 78, a chamber 100 formed between the collars 81 and 82 of the valve member and an exhaust port 101 in the valve casing 71. The left hand end of the cylinder 58 exhausts as described hereinbefore, fluid under pressure being admitted to the right hand end of cylinder 58 through the ports 86 and 80. With the valve as illustrated in Fig. 6b, both ends of the cylinder 58 are connected to exhaust, the right hand end of the cylinder then exhausting through port 80 and the open end 102 of the valve casing 71. It will be apparent that by moving the handle 12 in the opposite direction so as to actuate the valve 11 toward the right from the position shown in Fig. 6, the movement of the piston 57 will be in the opposite direction from that shown in Fig. 6a for the rapid traverse movement of the table and the pistons will be in the same positions as shown in Fig. 6b when the control handle 12 is in the other neutral position.

A trip device is preferably provided for controlling the table movements automatically. In its preferred form, this device includes the vertical shaft 90 (Figs. 6 and 7) which has a radially extending arm 105 on the upper end thereof. The free end of this arm carries a roller 106 which may be engaged by one or more dogs secured to the forward edge of the table 3 to actuate the valve 72 automatically.

As illustrated in Figs. 1, 2, 6 and 7, dogs are provided so that if the handle 12 is first moved manually to its rapid approach position R (Fig. 7) the table 3 will move downwardly (Figs. 2 and 7) until a feed dog 107 engages the roller 106 and moves the trip device to the feed position F as shown in Figs. 2 and 7. Thereupon the table will continue to move downwardly at a feed speed until a traverse dog 108 engages the roller 106 to move the handle 12 back to its rapid approach position R. The table will then move rapidly in the downward direction (Figs. 2 and 7) until a second feed dog 107 engages the roller 106 and moves the control handle to its feed position F. The table will then continue to move downwardly at a feed speed until a return traverse dog 108a engages the roller 106 and actuates the trip device to place the control handle 12 in its rapid return position R¹. The table will then move upwardly at a traverse rate until a stop dog 109 engages the trip device and moves the control handle 12 into the neutral position N¹.

This cycle is arranged for what is commonly termed as "intermittent milling", the table traveling at a slow rate of speed between the dogs 107 and 108 while the cutter is operating on one piece of work or one portion of a piece, and again moving at a slow rate between the second dog feed 107 and the return traverse dog 108 while the cutter is operating on another piece of work or another portion of the same piece. If merely a single work piece is to be operated upon the rapid approach dog 108 and the second feed dog 107 may be removed, whereupon the table will be actuated through a cycle comprising rapid approach, feed, rapid return and stop. It is of course contemplated that other arrangements of dogs may be provided to obtain other operating cycles, those illustrated herein being merely illustrative of well known cycles.

As mentioned hereinbefore the invention in its preferred form contemplates also means for automatically controlling the transmission of power to the rotating spindle 6. The gearing between the prime mover and the spindle is mounted principally in a casing 110 (Figs. 2, 8 and 9) which is mounted in the base 1 of the machine in a position such that a main drive pulley 112 mounted on a shaft 13 in the casing, is adapted to be belted to the pulley of the motor 9. Power is transmitted to the shaft 13 by means including a sprocket 114 and a chain 14a (Fig. 2) connecting said sprocket with the sprocket 14. The exemplary form of gearing to the spindle comprises (Figs. 8 and 9) a shaft 115 positioned above and parallel to the shaft 13, gears 116 and 117 connecting the shaft 115 with one element of the clutch 111, bevel gears 118, 119 and 120 comprising a reversing clutch for the spindle having an actuating element 121 keyed to the shaft 115, a short vertical shaft 122 carrying the bevel gear 119 and pickoff gears 123 and 124 connected one to the vertical shaft 122 and the other to a parallel vertical shaft 125. A vertical drive shaft 126 which extends upwardly to drive the spindle 6 is driven from the shaft 125 by means of a pair of gears 127 and 128. A cutter coolant pump (not shown) may be driven from the shaft 115 by means of a sprocket 115a (Fig. 9) so as to be started and stopped with the spindle 6.

The spindle disconnecting clutch 111 is arranged to be actuated by means of a clutch element 129 operable by means of a yoke 130 which is slidably mounted on a rod 131. The yoke 130 may be provided with a rack 132 with which a pinion 133 meshes. This pinion is mounted on a shaft 134 and is arranged to be operated by the feed clutch piston 66 as hereinafter more fully described. The clutch element 121 of the spindle reversing clutch is arranged to be operated manually by means of a yoke 135 slidably mounted on a rod 136. A knurled knob 137 rotatably mounted on a plate 138 secured to the side wall of the casing 110 carries an eccentric pin 139 on the inner end thereof engaging a vertical slot in the yoke 135. This permits the clutch element 121 to be shifted into engagement with either the gear 118 or the gear 120.

The piston 66 is also arranged to control the starting and stopping of the spindle 6 so that the spindle will be stopped just after the feed clutch 21 is disengaged and will be started just before the feed clutch is engaged. As illustrated herein (Figs. 3 and 5) a short shaft 141 is rotatably mounted in the rear wall of the casing 10 and carries on its inner end an arm 142. A pin 143 is pivotally secured to the lower end of said arm and provided with a slot 144 which engages the disk 69 on the piston rod 68. Thus when the piston 66 is actuated it operates the shaft 141. The outer end of the shaft 141 carries an arm 145, the free end of which is connected to one end of a link 146. The other end of the link 146 is connected to one end of an arm 147 mounted on the end of the shaft 134 (Fig. 8) so that motion is transmitted from the shaft 141 to the shaft 134 to actuate the spindle disconnecting clutch 111.

I claim as my invention:

1. A machine having, in combination, a base, a support slidably mounted on said base, means for moving said support including a feed clutch, and a reversing traverse clutch, pressure fluid actuated means for controlling the operation of said clutches, a control valve for said means, a trip device adjacent one edge of said support connected to said valve and movable into any one of a plurality of positions corresponding to the positions of said valve, a manual control handle whereby said valve may be moved into a position to engage said traverse clutch and cause said support to move rapidly in one direction, a dog movable with said support adapted to actuate said trip device to move said valve into a position to engage said feed clutch and cause said support to move slowly in the same direction, a second dog movable with said support arranged to actuate said device to move said valve to shift said traverse clutch into its reverse position and thereby rapidly return said support and a third dog movable with said support operable during said return movement to actuate said trip device and move said valve to disengage said traverse clutch and stop the support.

2. A machine having, in combination, a base, a support slidably mounted on said base, means for moving said support including a feed clutch and a reversing traverse clutch, means for controlling the operation of said clutches comprising a piston and cylinder device, one element of which is stationarily mounted and the other connected to operate said traverse clutch, a second piston and cylinder device, one element of which is stationarily mounted and the other arranged to operate said feed clutch, a control valve for said devices, a trip device connected to said valve movable into any one of a plurality of positions corresponding to the positions of said valve, a manual control handle whereby said valve may be operated, a dog movable with said support adapted to actuate said trip device to move said valve into a position to engage said feed clutch, a second dog movable with said support arranged to actuate said device to move said valve to engage said traverse clutch and a third dog movable with said support operable to actuate said trip device and move said valve to disengage said traverse clutch.

3. A machine having, in combination, a base, a support slidably mounted on said base, means for moving said support including a feed clutch and a forward and reverse traverse clutch having a neutral intermediate position, means normally holding said traverse clutch in its neutral position, means for controlling the operation of said clutches comprising a piston and cylinder device for each clutch, a unitary control valve for said devices having forward-traverse, feed, reverse-traverse and stop positions in the order named and arranged to engage said feed clutch when the traverse clutch is in its neutral position, a trip device connected to said valve movable into any one of a plurality of positions corresponding to the positions of said valve, a manual control handle whereby said valve may be operated and dogs movable with said support adapted to actuate said trip device.

4. A machine having, in combination, a base, a support slidably mounted on said base, mechanical means for moving said support including a feed clutch and a friction type forward and reverse traverse clutch, means for controlling the operation of said clutches including a piston and cylinder device, one element of which is connected to operate and maintain the engagement of said traverse clutch, a single control valve for said means having forward-traverse, feed and reverse-traverse positions, a trip device connected to said valve movable into any one of a plurality of positions corresponding to the positions of said valve and means for automatically actuating said trip device.

5. In a machine tool, in combination, a movable support, mechanical means for actuating said support including a forward and reverse traverse clutch, a feed clutch arranged to be engaged when said traverse clutch is in its neutral position and means for reversing the direction of drive of said feed clutch, pressure fluid operated means for controlling said clutches, a five position valve for said means having stop, forward-traverse, feed, reverse-traverse and stop positions, manually operable control means for said valve and means for manually reversing said feed drive reversing means independently of said control means.

6. In a machine tool, in combination, a movable support, transmission mechanism for actuating said support including a forward and reverse traverse clutch shiftable to first, second and intermediate positions respectively productive of different effect from said transmission and a feed clutch arranged to be engaged when said traverse clutch is in its intermediate position, means normally holding said traverse clutch in its neutral position, pressure fluid operated means for controlling said clutches, a five position valve for said means having stop, forward-traverse, feed, reverse-traverse and stop positions in the order named, and means carried by said support for automatically shifting said valve.

7. In a machine tool, in combination, a movable support, mechanical means for actuating said support including a forward and reverse traverse clutch and a feed clutch jointly shiftable to cause said actuating means to effect forward-traverse, feed, reverse-traverse and stop, pressure fluid operated means for controlling said clutches, a single valve for said means having forward-traverse, feed, reverse-traverse and stop positions, and means for automatically controlling said valve to move said support through a cycle comprising forward-traverse, feed, reverse-traverse and stop.

8. A machine tool comprising, in combination, a rotatably mounted spindle, a slidably mounted support, means for actuating one of said elements including a first clutch, means for actuating the other of said elements including a feed clutch and a reversing clutch, means for controlling the operation of two of said clutches comprising a piston and cylinder device, means for controlling the other clutch comprising a second piston and cylinder device, a unitary control valve for said devices, trip mechanism connected to said valve and means carried on said support to actuate said trip mechanism.

9. A machine tool comprising, in combination, a rotatably mounted spindle, a slidably mounted support, means for actuating one of said elements including a first clutch, means for actuating the other of said elements comprising a feed clutch and a reversing traverse clutch, means for controlling the operation of said first clutch and said feed clutch comprising a piston and cylinder device, means for controlling said reversing clutch comprising a second piston and cylinder device, a unitary control valve for said devices, trip mechanism for shifting said valve, and means operable through the support actuating means to actuate said trip mechanism.

10. A machine tool comprising, in combination, a rotatably mounted spindle, a slidably mounted support, means for actuating one of said elements including a first clutch, means for actuating the other of said elements comprising a feed clutch and a reversing traverse clutch, means for controlling the operation of two of said clutches comprising a single piston and cylinder device, a control valve for said device, trip mechanism for shifting said valve and means operable through one of said actuating means for actuating said trip mechanism.

11. A machine tool comprising, in combination, a rotatably mounted spindle, a slidably mounted support, means for actuating said spindle including a first clutch, means for actuating said support including a feed clutch and a reversing traverse clutch, means for controlling the operation of said feed clutch and said first clutch comprising a single piston and cylinder device, means for controlling said reversing clutch comprising a second piston and cylinder device, a unitary control valve for said devices, trip mechanism connected to operate said valve and means carried on said support to actuate said trip mechanism.

12. In a machine tool, in combination, a tool support, a work support, means for actuating said tool support including a disconnecting clutch, means for actuating said work support including a disconnecting clutch, means including a piston and cylinder device for actuating said clutches arranged to engage said clutches when moved in one direction and to disengage said clutches when moved in the opposite direction and a valve for controlling said piston and cylinder device.

13. A machine tool comprising, in combination, a rotatably mounted spindle, a slidably mounted support, means for actuating said spindle including a disconnecting clutch, a transmission for actuating said support including a feed train and a rapid traverse train in parallel therewith and terminating in a common drive member for the support, said feed train including a disconnecting clutch and said rapid traverse train including a reversing clutch, and control mechanism for said clutches comprising a first piston and cylinder device for controlling said spindle clutch and said feed disconnecting clutch, a second piston and cylinder device for controlling said traverse reversing clutch, a single control valve for said devices, and means for shifting said valve.

14. In a machine tool in combination, a movable support, transmission mechanism for actuating said support including a forward and reverse traverse clutch and a feed clutch jointly shiftable to four positions respectively productive of different effect from said transmission, pressure fluid operated means for shifting said clutches to any of said positions, and a valve for controlling said fluid pressure means adjustable to different positions respectively individual to the different clutch positions.

15. In a machine tool in combination, a movable support, transmission and control mechanism for actuating said support including a feed train and a rapid traverse train in parallel therewith and terminating in a common drive member for said support, said feed train including a two-position disconnecting clutch, said rapid traverse train including a three-position reversing clutch, pressure fluid operated means for actuating said clutches, a five-position valve for said pressure fluid means having stop, forward-traverse feed, reverse-traverse and stop positions in the order named, and means for shifting said valve to various of said positions to obtain the desired cycle.

16. In a machine tool, in combination, a movable support, transmission and control mechanism for actuating said support including parallel trains terminating in a common drive member, a clutch in one of said trains for connecting or disconnecting the same from said common drive member, a reversing clutch in the other of said trains, pressure fluid operated means for actuating said clutches, a single valve for controlling said pressure fluid means, and means for shifting said valve.

17. In a machine tool, in combination, a movable support, transmission and control mechanism for actuating said support including a feed train and a traverse train parallel with the feed train and terminating in a common drive member for the support, said feed train including a disconnecting clutch and said traverse train including a reversing clutch having an intermediate neutral position, a piston and cylinder device for actuating the disconnecting clutch in said feed train, a second piston and cylinder device for actuating the reversing clutch in the traverse train, a single valve for controlling said piston and cylinder devices having a plurality of positions respectively individual to different positions of said disconnecting and reversing clutches to obtain different effect from the transmission, and means for shifting said valve.

GUSTAF DAVID SUNDSTRAND.